April 28, 1964 J. DECKER 3,130,526
MECHANISM FOR SECURING MOVABLE MACHINE TOOL MEMBERS
Filed May 7, 1962 2 Sheets-Sheet 1

INVENTOR.
JACOB DECKER
BY
*Howard Keiser*
*& Jack J. Earl*
ATTORNEYS

United States Patent Office 3,130,526
Patented Apr. 28, 1964

3,130,526
MECHANISM FOR SECURING MOVABLE
MACHINE TOOL MEMBERS
Jacob Decker, Cincinnati, Ohio, assignor to The Cincinnati Milling Machine Co., Cincinnati, Ohio, a corporation of Ohio
Filed May 7, 1962, Ser. No. 192,912
5 Claims. (Cl. 51—236)

This invention relates to a clamping mechanism particularly suitable to secure the headstock and footstock of a precision grinding machine to the grinding machine worktable.

In a precision center-type grinding machine, misalignment of work supporting centers is a factor which adversely affects the final size and roundness of a workpiece as well as the repeatability of the machine. The centers are fixed in the headstock and footstock of the machine. The headstock and footstock are in turn fixed to the machine table by similar clamping mechanisms. In order to obtain proper alignment of each of the center carrying members and thereby to have axial alignment of the centers, each of the center carrying members is normally clamped at two places along the table. This does not solve the alignment problem in itself. It is difficult to get equal clamping forces on each of the members at both clamp locations. Unequal clamping forces will cause warpage and misalignment that is difficult to correct. Likewise, excessive clamping force, although it may be equal at both locations, may severely warp the center-carrying member and the supporting table member to prevent accurate center alignment.

It is therefore an object of this invention to provide a mechanism by which one member can be clamped to another at two spaced locations with equal force at each location.

It is also an object of this invention to provide a mechanism which clamps at two locations simultaneously by operation of a single actuating member.

It is yet another object of this invention to provide a clamping mechanism by which the amount of clamping force produced may be limited to a predetermined amount.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, the invention may be described to clamp a grinding machine footstock to a dovetail way or table. An aligning surface depends from one side of the footstock to engage one side of the dove-tail way. On the other side of the footstock, a pair of clamps is attached to the footstock at spaced locations. The upper end of each of the clamps is in pivotal contact with the footstock while the lower end of each extends below the footstock and adjacent to the other side of the dove-tail way. The lower end of each is adapted to engage the side of the dove-tail way. A stiffly resilient strap member extends between the clamps and is engaged with each clamp between the ends of the clamp. The strap is pulled in toward the footstock at a point midway between the clamps to pivot the clamps around their upper ends to bring the lower ends into forcible contact with the side of the dove-tail way. The strap is symmetrical on opposite sides of its center. Therefore the force at each of the clamps is equal to that of the other clamp. By placing a rigid spacer between the strap and the footstock, the amount that the strap may be pulled down is limited to a predetermined amount. The force produced on each clamp is then determined by this amount and by the stiffness of the strap.

A complete understanding of the construction and operation of this invention can be obtained from the following detailed description in which reference is made to the attached drawings wherein.

Figure 1:
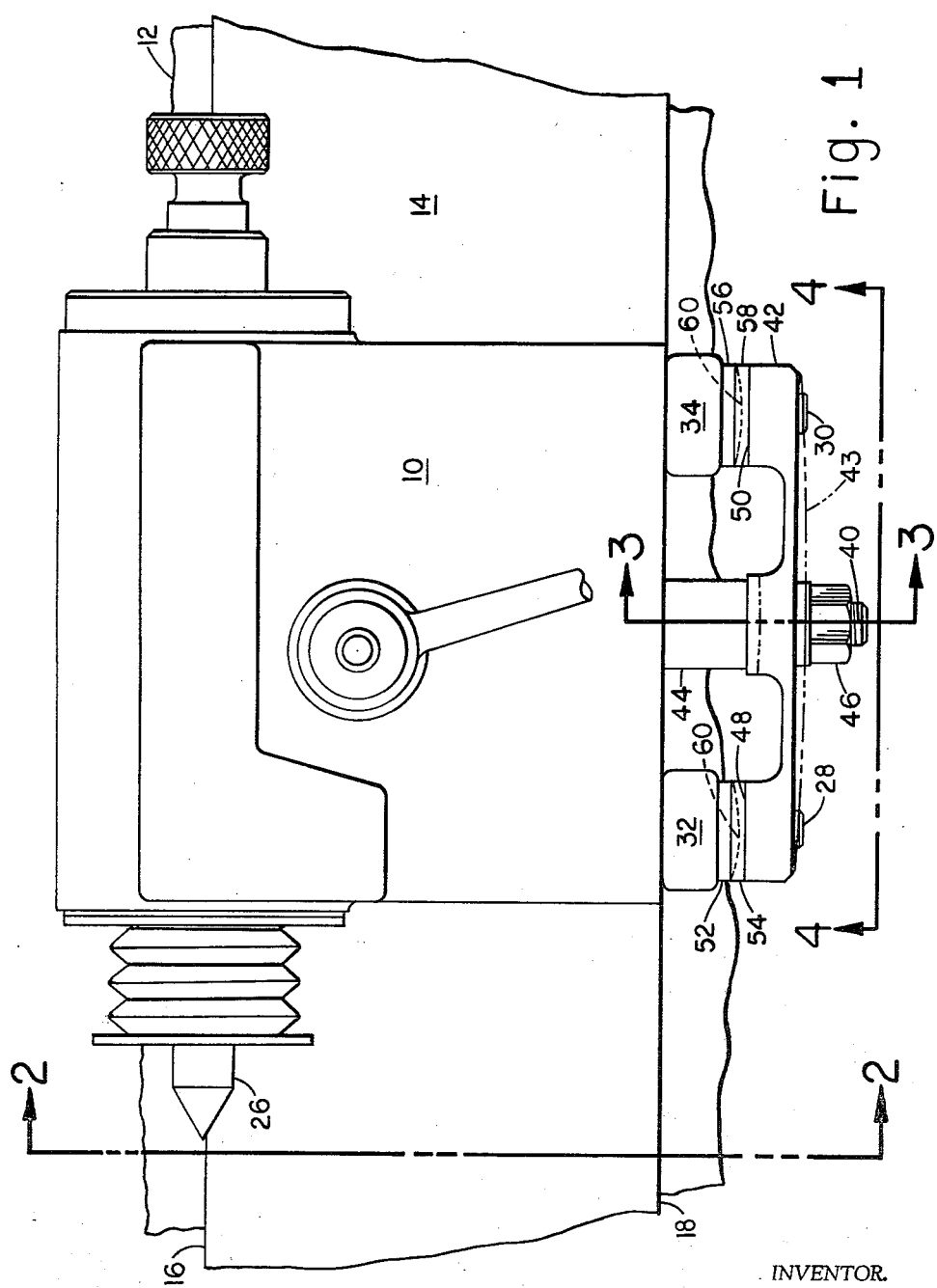
FIG. 1 is a plan view of a grinding machine footstock.
Figure 2:
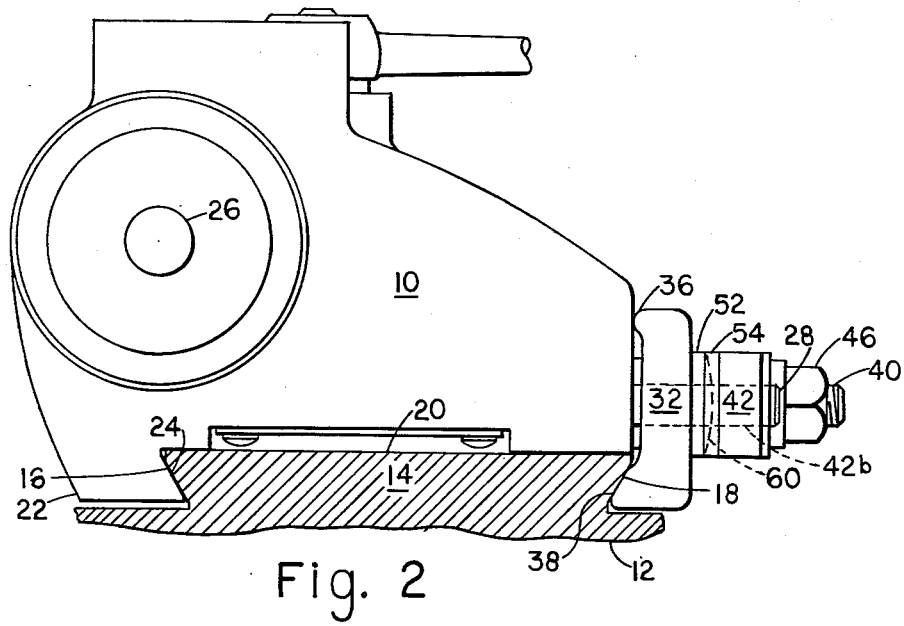
FIG. 2 is a left end view of the footstock in elevation from line 2—2 of FIG. 1.

As shown in FIGS. 1 and 2, the footstock 10 is supported on the table 12 where it can be axially positioned along a dovetail way 14 and clamped thereto. Each side 16, 18 of the dovetail way 14 slopes inwardly from the top surface 20. A portion 22 of the footstock 10 extends below the surface 20 at one side of the dovetail way 14. A surface 24 extends along the portion 22 and is formed to mate with the side 16 of the dovetail way 14. This surface 24 is an aligning reference surface and when it is in intimate contact with the surface 16 along its length, the footstock 10 is in proper alignment on the table 12 to bring the longitudinal axis of the center 26 into parallel relationship with the side 16.

Figure 4:
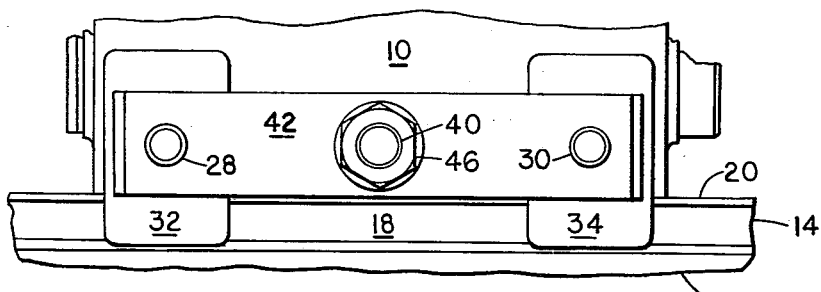
FIG. 4 is a partial front view of the footstock in elevation as viewed from line 4—4 of FIG. 1.

A pair of pins 28, 30 (FIGS. 1, 2, 4) are fixed in the side of the footstock 10 opposite the depending portion 22. Each of the pins 28, 30 has a clamp 32, 34, respectively, loosely received thereon. Each of the clamps 32, 34 has a heel 36 at its upper end (as viewed in FIG. 2). The heel 36 is rounded and engages the side of the footstock 10 to allow the clamps 32, 34 to pivot on the side of the footstock 10. Each of the clamps 32, 34 also has a toe 38 on its lower end which is adapted to engage the side 18 of the dovetail way 14 as the clamps 32, 34 are pivoted about their heels 36 to swing the toes 38 toward the side 18.

Figure 3:
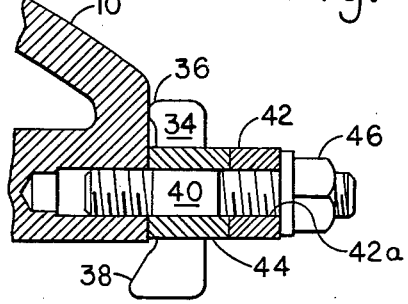
FIG. 3 is a partial section of FIG. 1 on line 3—3.

A stud 40 is fixed in and extends from the side of the footstock 10 midway between the pins 28, 30. A strap 42 having openings through its center, 42a, and ends, 42b, is loosely received over the pins 28, 30 and stud 40. A spacer 44 (FIGS. 1, 3) is received over the stud 40 between the strap 42 and the footstock 10. A nut 46 is in threaded engagement over the stud 40 and is operable to force the middle of the strap 42 toward the footstock 10 until the strap 42 is in firm contact with the spacer 44. The spacer 44 is, in turn, in firm contact with the footstock 10. By forcing the strap 42, which is stiffly resilient, toward the footstock 10 from its normal unstressed position 43, the strap 42 is bent inwardly at its center from its normal, unstressed condition. With the strap 42 bowed inwardly, reactive forces are created between the toes 38 and the side 18 of the dovetail way 14 which will draw the footstock 10 over until the depending aligning surface 24 is in intimate contact with the side 16. The inward slope of the sides 16, 18 will cause the footstock 10 to be held downward against the top surface 20. The friction between the footstock 10 and the dovetail way 14 resulting from the reactive forces between the side 18 and toes 38 will fix the footstock firmly to the table 12.

Since the strap 42 bows inwardly as it is pulled toward the footstock 10 from its normal unstressed position 43, there is a small amount of change in the alignment of the surfaces 48, 50 of the strap 42 and the clamps 32, 34 as the nut 46 is tightened down. Therefore the washers 52, 54 and 56, 58 are placed over the pins 28, 30, respectively, between the strap 42 and the clamps 32, 34. The washers 52, 54 as well as washers 56, 58 have smooth mating surfaces 60. The surface 60 is shaped such that the washers 52, 56 are convex while washers 54, 58 are concave. This provides a hallow ball and socket surface to allow for the changes in relative position of the surfaces 48, 50 and the clamps 32, 34.

The strap 42 is symmetrical on opposite sides of its middle which is received over the stud 40. Therefore the reactive clamping force on each of the toes 38 of the clamps 32, 34 is equal. Also, since the force that may be produced at each clamp 32, 34 is dependent upon the amount of bow in the strap 42, the length of the spacer 44 controls the amount of force produced on each clamp. The length of the spacer 44 is then determined by the stiffness of the strap 42 and the allowable forces which may be produced at the clamps 32, 34 without harmful effect. Thus it is seen that the mechanism described can be utilized to create clamping forces of equal and fixed maximum predetermined magnitudes at each of the clamps 32, 34.

I claim:

1. A clamping mechanism to secure a removable member of a machine onto a supporting member, the mechanism comprising:
   (a) an aligning surface depending from one side of the removable member and adapted to engage one side of the supporting member,
   (b) a pair of spaced clamp members on the other side of the removable member, each of said pair having one end adapted to pivotally engage said other side of the removable member, and the other end of each of said pair adapted to engage the other side of said supporting member,
   (c) strap member adapted to extend across said pair of clamp members and to engage each of said pair between the ends thereof, and
   (d) means to pull said strap member toward said removable member at a location between said pair of clamp members, thereby holding said strap member in forcible contact with each of said pair of clamp members to produce a clamping force between said aligning surface and said other end of each of said pair to grip said supporting member.

2. A clamping mechanism to secure a removable member of a machine onto a supporting member, the mechanism comprising:
   (a) an aligning surface depending from one side of the removable member and adapted to engage one side of the supporting member,
   (b) a pair of spaced clamp members on the other side of the removable member, each of said pair having one end adapted to pivotally engage said other side of the removable member and the other end of each of said pair adapted to engage the other side of said supporting member,
   (c) a strap member symmetrical on opposite sides of the center thereof and adapted to extend across said pair of clamp members, each end of said strap member adapted to engage one of said pair between the ends thereof, and
   (d) means to pull the center of said strap member a predetermined amount toward said removable member, thereby holding said strap member in equal forcible contact with each of said pair of clamp members to produce equal clamping forces between said aligning surface and said other end of each of said pair to grip said supporting member.

3. A clamping mechanism to secure a removable member of a machine onto a supporting member, the mechanism comprising:
   (a) a way on said supporting member to bear the removable member and having sides sloping inwardly from the top surface thereof,
   (b) an aligning surface depending from one side of the removable member and adapted to engage and mate with one of said sloping sides,
   (c) a pair of spaced clamp members on the other side of the removable member, each of said pair having one end adapted to pivotally engage said other side of the removable member and the other end of each of said pair adapted to engage the other side of said way,
   (d) a strap member symmetrical on opposite sides of the center thereof and adapted to extend across said pair of clamp members, each end of said strap member adapted to engage one of said pair of clamp members between the ends thereof, and
   (e) means to pull the center of said strap member a predetermined amount toward said removable member, thereby holding said strap member in equal forcible contact with each of said pair of clamp members to produce equal clamping forces between said aligning surface and said other end of each of said pair to hold the removable member on said way with the aligning surface in conformity with said one sloping side of said way.

4. A clamping mechanism to secure a removable member of a machine onto a supporting member, the mechanism comprising:
   (a) a way on said supporting member to bear the removable member and having sides sloping inwardly from the top surface thereof and extending parallelly along said way,
   (b) an aligning surface depending from one side of the removable member and adapted to engage and mate with one of said sloping sides,
   (c) a pair of spaced clamp members on the other side of the removable member, each of said pair having one end adapted to pivotally engage said other side of the removable member and the other end of each of said pair adapted to engage the other side of said way,
   (d) a strap member symmetrical on opposite sides of the center thereof and adapted to extend across said pair of clamp members, each end of said strap member adapted to engage one of said pair of clamp members between the ends thereof, said strap member having an opening through the center thereof,
   (e) a stud fixed in the removable member equidistant between said clamp members and having a threaded end extending loosely through said strap member opening,
   (f) a spacer received around said stud between said strap member and the movable member, and
   (g) a nut in threaded engagement on said stud to hold said strap member against said spacer to apply a predetermined pull on said strap member at its center, thereby holding said strap member in equal forcible contact with each of said clamp members to produce equal clamping forces between said aligning surface and said other end of each of said pair of clamp members to hold the removable member on said way with the aligning surface in conformity with said one sloping side of said way.

5. A clamping mechanism to secure a removable member of a machine onto a supporting member, the mechanism comprising:
   (a) a way on said supporting member to bear that removable member having sides sloping inwardly from the top surface thereof and extending parallelly along said way,
   (b) an aligning surface depending from one side of the removable member and adapted to engage and mate with one of said sloping sides,
   (c) a pair of spaced pins fixed in and extending from the other side of the removable member,
   (d) a pair of clamp members, one of said clamp members loosely received at the center thereof over each of said pins, each of said clamp members having one end pivotally engaged with said other side of the removable member and an opposite end adapted to engage the other side of said way,
   (e) a strap member symmetrical on opposite sides of the center thereof, each end of said strap member loosely received on one of said pins and over one of said clamp members, said strap member having an opening through the center thereof,
(f) a pair of washers loosely received on each of said pins between the end of the strap member and the clamp member received thereon, one of each pair of washers having a smooth convex surface and the other of each pair of washers having a smooth concave surface mating with said convex surface,
(g) a stud fixed in the removable member equidistant between said pins and having a threaded end extending loosely through said strap member opening,
(h) a spacer received around said stud between said strap member and the removable member, and
(i) a nut in threaded engagement on said stud to hold said strap member against said spacer to apply a predetermined pull on said strap member at its center, thereby holding said strap member in equal forcible contact with each of said clamp members to produce equal clamping forces between said aligning surface and said other end of each of said pair of clamp members to hold the removable member on said way with the aligning surface in conformity with said one sloping side of said way.

References Cited in the file of this patent

UNITED STATES PATENTS

| | | |
|---|---|---|
| 1,397,696 | Nelson | Nov. 22, 1921 |
| 2,002,938 | Dumser et al. | May 28, 1935 |
| 2,526,386 | Meylich et al. | Oct. 17, 1950 |